(12) United States Patent
Hogan et al.

(10) Patent No.: US 11,782,639 B2
(45) Date of Patent: Oct. 10, 2023

(54) AUTOMATED DATASTORE UNAVAILABILITY HANDLING

(71) Applicant: VMware, Inc., Palo Alto, CA (US)

(72) Inventors: Cormac Hogan, Cork (IE); Duncan Epping, Helmond (NL); Frank Denneman, Purmerend (NL)

(73) Assignee: VMware, Inc., Palo Alto, CA (US)

( * ) Notice: Subject to any disclaimer, the term of this patent is extended or adjusted under 35 U.S.C. 154(b) by 39 days.

(21) Appl. No.: 17/167,682

(22) Filed: Feb. 4, 2021

(65) Prior Publication Data

US 2022/0244887 A1   Aug. 4, 2022

(51) Int. Cl.
*G06F 3/06*   (2006.01)
*G06F 9/455*  (2018.01)

(52) U.S. Cl.
CPC .......... *G06F 3/0659* (2013.01); *G06F 3/0617* (2013.01); *G06F 3/0664* (2013.01); *G06F 3/0689* (2013.01); *G06F 9/45558* (2013.01); *G06F 2009/45583* (2013.01)

(58) Field of Classification Search
CPC .... G06F 3/0659; G06F 3/0617; G06F 3/0664; G06F 3/0689; G06F 9/45558; G06F 2009/45583
USPC ................................................ 711/154, 100
See application file for complete search history.

(56) References Cited

U.S. PATENT DOCUMENTS

| | | | |
|---|---|---|---|
| 2009/0172666 A1* | 7/2009 | Yahalom | G06F 3/067 718/1 |
| 2011/0035620 A1* | 2/2011 | Elyashev | G06F 11/0751 718/1 |
| 2014/0059379 A1* | 2/2014 | Ren | G06F 11/1484 714/15 |
| 2014/0095826 A1* | 4/2014 | Rajagopal | G06F 3/0607 711/170 |
| 2020/0225971 A1* | 7/2020 | Viswanathan | H04L 67/1097 |
| 2022/0027247 A1* | 1/2022 | Vengurlekar | G06F 11/3072 |

OTHER PUBLICATIONS

NPL, Meyer, "VM Component Protection (VMCP)", VMWare vSphere Blog, Jun. 9, 2015 (Year: 2015).*

* cited by examiner

*Primary Examiner* — David Yi
*Assistant Examiner* — Zubair Ahmed

(57) ABSTRACT

Techniques for automated datastore unavailability handling are provided. In one set of embodiments, a computer system can receive a request to bring a datastore offline and, in response to the request, identify one or more virtual machines (VMs) in a virtualized computing environment that have one or more virtual disks stored in the datastore. The computer system can then, for each of the one or more VMs, determine an action to be taken with respect to the VM in response to the datastore's unavailability and trigger execution of the action.

22 Claims, 4 Drawing Sheets

AUTOMATED DATASTORE UNAVAILABILITY HANDLING

BACKGROUND

Unless otherwise indicated, the subject matter described in this section is not prior art to the claims of the present application and is not admitted as being prior art by inclusion in this section.

In a virtualized computing environment comprising virtual machines (VMs), each VM is associated with one or more virtual disks that hold persistent data used by the VM. These virtual disks are provisioned and maintained in logical storage containers known as datastores, which reside on a storage infrastructure and are mounted to host systems in the environment where the VMs run.

When a datastore is scheduled to be brought offline for maintenance at the storage infrastructure level or for other reasons, it is generally advisable to take operational actions on the VMs whose virtual disks are maintained in that datastore to prevent the VMs from failing. According to one approach, an individual such as an environment administrator can carry out this process manually. However, because datastores may be mounted to multiple host clusters within a virtualized computing environment (and/or to multiple different environments), manually identifying all of the VMs that have virtual disks in a given datastore and initiating an appropriate operational action for each identified VM can be a time-consuming and difficult task.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

Embodiments of the present disclosure are directed to techniques for automatically handling the planned unavailability of datastores that are mounted to host systems/clusters in a virtualized computing environment. In one set of embodiments, a virtual infrastructure management (VIM) server designated to manage the virtualized computing environment can implement (1) a configuration setting for each VM in the environment that defines a desired action to be taken with respect to the VM in the case where the datastore on which the VM's virtual disks reside is scheduled/requested to become unavailable (referred to herein as the VM's "storage-unavailability-response" action), and (2) a mechanism for tracking which datastores are mounted to the environment's host systems/clusters and which VMs have virtual disks stored in each mounted datastore.

With (1) and (2) in place, at the time of receiving a request to bring a datastore offline for storage infrastructure maintenance or other reasons, the VIM server can automatically identify all VMs in the virtualized computing environment with virtual disks in that datastore and, for each identified VM, cause its storage-unavailability-response action to be executed. This storage-unavailability-response action can involve, e.g., powering-off the VM or migrating the VM's virtual disks to another available datastore. Once the storage-unavailability-response actions for all identified VMs have been executed, the datastore can be unmounted from the environment's host systems/clusters and taken out of service as planned.

2. Example Scenarios and Solution Architecture

Figure 1:
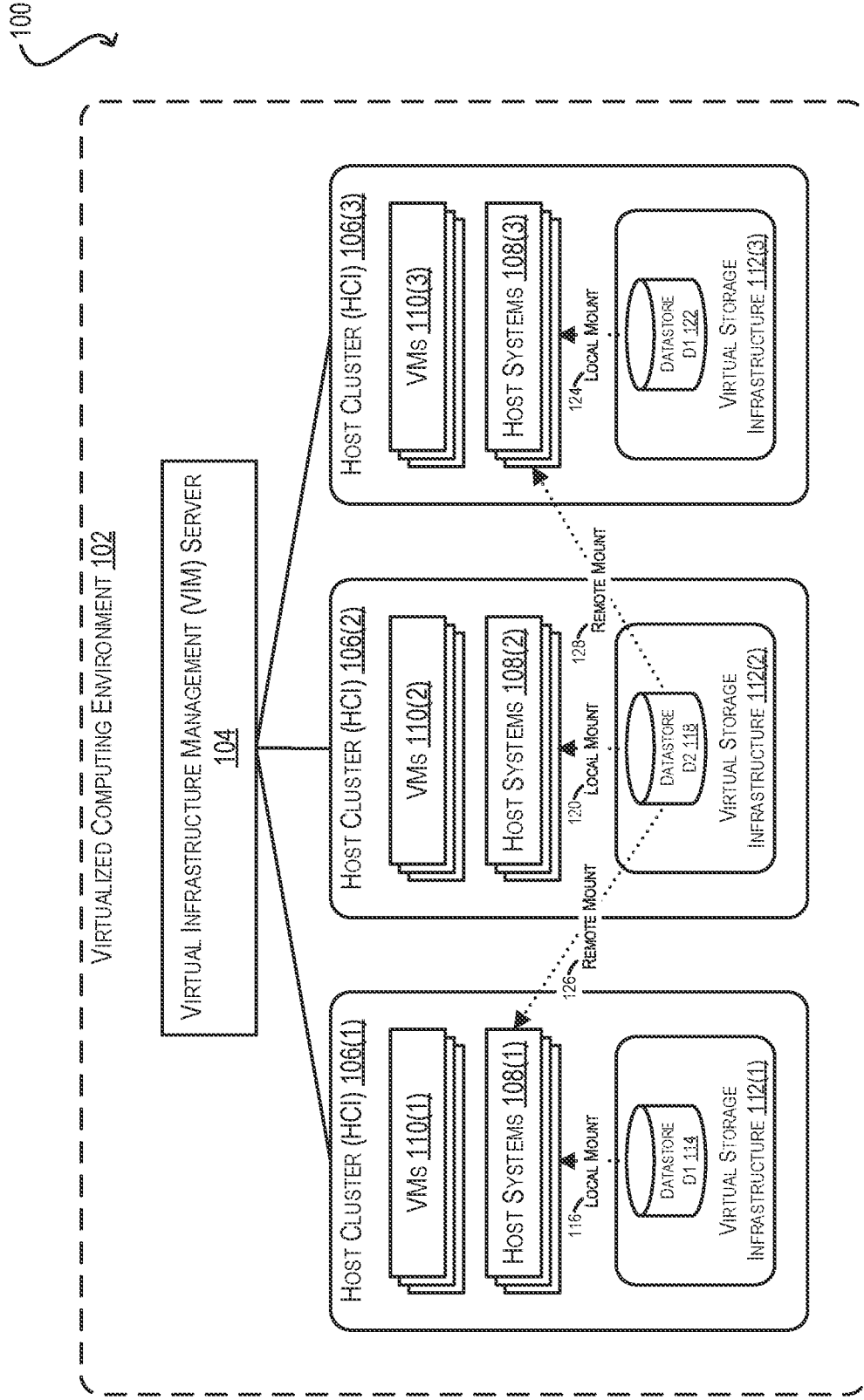
FIG. 1 depicts a first example scenario in which embodiments of the present disclosure may be implemented.
Figure 2:
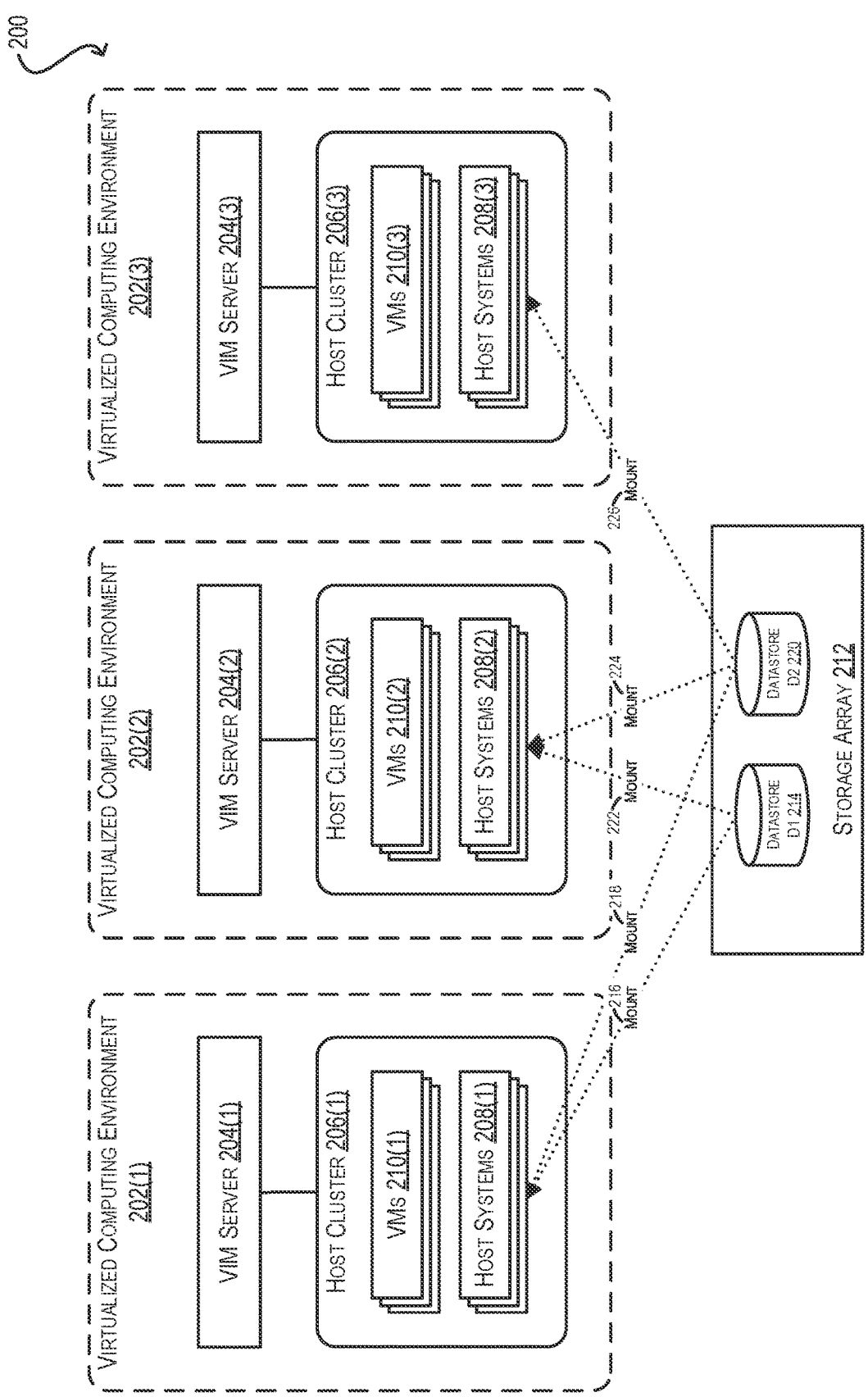
FIG. 2 depicts a second example scenario in which embodiments of the present disclosure may be implemented.

FIGS. 1 and 2 depict two example scenarios 100 and 200 in which embodiments of the present disclosure may be implemented. In scenario 100 of FIG. 1, a virtualized computing environment 102 is deployed that comprises a VIM server 104 coupled with three host clusters 106(1)-(3). VIM server 104 is a computer system or group of computer systems that is designated to manage the lifecycle and operation of host clusters 106(1)-(3) and their constituent components. For example, VIM server 104 may run an instance of VMware's vCenter Server or any other similar virtual infrastructure management software known in the art.

Each host cluster 106 in environment 102 includes a group of host systems 108 and respective hypervisors (not shown) that run one or more VMs 110. Further, each host cluster 106 is configured to operate as a hyper-converged infrastructure (HCI) cluster, which means that the local storage resources of the cluster's host systems (e.g., host-side hard disks, host-side solid state disks, etc.) are aggregated into a cluster-wide virtual storage infrastructure 112. This virtual storage infrastructure is used to hold logical storage containers known as datastores that in turn store, among other things, virtual disks belonging to VMs that run on the cluster. As used herein, a virtual disk is a set of one or more files or objects that hold persistent data used by, or related to, a VM. For example, as shown in FIG. 1, virtual storage infrastructure 112(1) of host cluster 106(1) includes a first datastore D1 (reference numeral 114) that is locally mounted to the cluster's host systems 108(1) (illustrated via arrow 116) for the purpose of storing and providing access to virtual disks belonging to one or more of VMs 110(1). Similarly, virtual storage infrastructure 112(2) of host cluster 106(2) includes a second datastore D2 (reference numeral 118) that is locally mounted to the cluster's host systems 108(2) (illustrated via arrow 120) for the purpose of storing and providing access to virtual disks belonging to one or more of VMs 110(2), and virtual storage infrastructure 112(3) of host cluster 106(3) includes a third datastore D3 (reference numeral 122) that is locally mounted to the cluster's host systems 108(3) (illustrated via arrow 124) for the purpose of storing and providing access to virtual disks belonging to one or more of VMs 110(3).

In addition to implementing HCI, each host cluster 106 in environment 102 supports a feature called HCI datastore sharing (also known as HCI mesh), which allows a datastore that resides in the virtual storage infrastructure of one HCI cluster to be remotely mounted by other HCI clusters (and thereby store the virtual disks of VMs running on those other clusters). For example, datastore D2 of host cluster 106(2)—which is locally mounted to host systems 108(2) as described above—is also remotely mounted to host systems 108(1) of host cluster 106(1) (illustrated via arrow 126) and to host systems 108(3) of host cluster 106(3) (illustrated via arrow 128). In this scenario, datastore D2 is referred to as a remote datastore of host clusters 106(1) and 106(3) and a local datastore of host cluster 106(2). With this configuration, datastore D2 can store virtual disks used by remotely running VMs 110(1) and 110(3) in addition those used by locally running VMs 110(2), which can be useful if, e.g., host clusters 106(1) and 106(3) run out of space in their respective virtual storage infrastructures for holding virtual disk data.

Turning now to scenario 200 of FIG. 2, three virtualized computing environments 202(1)-(3) are deployed that each comprise a VIM server 204 and a host cluster 206 with host systems 208 and VMs 210. Unlike scenario 100 of FIG. 1, host clusters 206(1)-(3) do not implement HCI for persisting datastores/virtual disks within the clusters themselves; instead, host clusters 206(1)-(3) interact with an external storage infrastructure, such as network-attached storage array 212, for their storage needs. For instance, as shown in FIG. 2, storage array 212 maintains a first datastore D1 (reference numeral 214) that is mounted to host cluster 206(1) of environment 202(1) (illustrated via arrow 216) and to host cluster 206(2) of environment 202(2) (illustrated via arrow 218), thereby enabling the VMs of these two clusters to store and access their virtual disk data on datastore D1. In addition, storage array 212 maintains a second datastore D2 (reference numeral 220) that is mounted to all three host clusters 206(1)-(3) (illustrated via arrows 222-226), thereby enabling the VMs of these three clusters to store and access their virtual disk data on datastore D2.

As noted in the Background section, when a datastore is scheduled to be brought offline for storage infrastructure maintenance or other reasons, it is generally advisable to take some operational action on each VM that has virtual disks stored therein, such as powering-off the VM or migrating its virtual disks to another available datastore. If such actions are not taken, the VMs will no longer be able to access their virtual disks once the datastore goes offline, resulting in runtime failures.

According to one approach, an individual (e.g., environment administrator) can carry out this process manually. However, as shown in scenario 100 of FIG. 1, it is possible for a datastore that resides in the virtual storage infrastructure of one HCI cluster to be remotely mounted to multiple other HCI clusters via HCI datastore sharing. Further, as shown in scenario 200 of FIG. 2, it is possible for a datastore that resides in an external storage infrastructure to be mounted to multiple host clusters across different virtualized computing environments. Although the degree of datastore sharing/cross-mounting depicted in these scenarios is fairly small for ease of illustration, in real-world deployments the degree of datastore sharing/cross-mounting can be significantly higher. Thus, it can be difficult and time-consuming for an individual to manually identify all of the VMs that have virtual disks in a given datastore (because those VMs can potentially span across many clusters/environments) and manually initiate an appropriate operational action for each VM.

Figure 3:
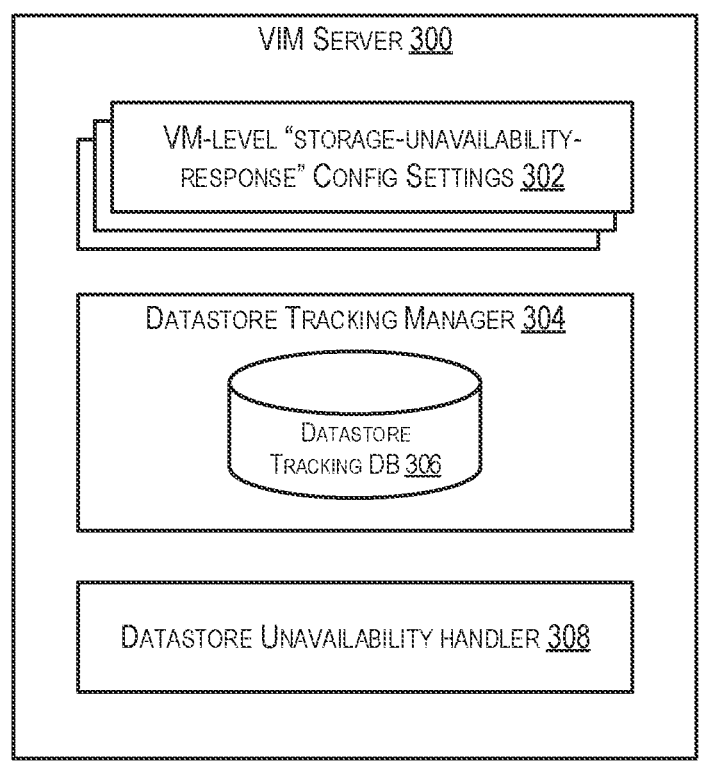
FIG. 3 depicts a virtual infrastructure management server according to certain embodiments.

To address the foregoing and other similar issues, FIG. 3 depicts the architecture of an enhanced VIM server 300 according to certain embodiments of the present disclosure. As shown, VIM server 300—which can be used in place of VIM server 104 in FIG. 1 and each VIM server 204 in FIG. 2—includes a plurality of VM-level storage-unavailability-response configuration settings 302, a datastore tracking manager 304 comprising a datastore tracking database (DB) 306, and a datastore unavailability handler 308.

In operation, each time a new VM is provisioned within the virtualized computing environment managed by VIM server 300, VIM server 300 can create a storage-unavailability-response configuration setting 302 for the VM that defines a desired action to be taken on that VM if the datastore on which the VM's virtual disks reside is designated/requested to become unavailable. This action, referred to as the VM's storage-unavailability-response action, can be specified by the VM's creator and can comprise, e.g., powering-off the VM, migrating the VM's virtual disks to another datastore that is available to the host system on which the VM runs, or doing nothing (i.e., taking no action, which may be useful if most datastore unavailability events in the environment are expected to be short-lived). If the VM's creator does not specify a particular storage-unavailability-response action for the VM at the time its provisioning, VIM server 300 can populate the VM's configuration setting 302 with a default storage-unavailability-response action that is defined at the cluster or environment level.

In addition, datastore tracking manager 304 can automatically keep track of the datastores that are mounted to the host systems/clusters of the virtualized computing environment and can maintain information regarding the mounted datastores in datastore tracking DB 306. In various embodiments this information can include, for each host cluster of the environment, a list of datastores currently mounted to the host systems of the cluster and, for each datastore in the list, the source of the datastore (e.g., local HCI cluster, remote HCI cluster, external storage infrastructure, etc.) and a list of VMs that have virtual disks stored in that datastore. For example, Listing 1 below presents datastore information that may be maintained in datastore tracking DB 306 for virtualized computing environment 102 shown in FIG. 1:

```
Listing 1-Datastore tracking information for environment 102

Cluster 106(1) {
    Datastore D1 {
        Source = Local HCI
        VMList = VM_A, VM_B, VM_C
    }
    Datastore D2 {
        Source = Remote HCI Cluster 106(2)
        VMList = VM_D, VM_E
    }
}
Cluster 106(2) {
    Datastore D2 {
        Source = Local HCI
        VMList = VM_F, VM_G
    }
}
Cluster 106(3) {
    Datastore D3 {
        Source = Local HCI
        VMList = VM_H, VM_I, VM_J
    }
    Datastore D2 {
        Source = Remote HCI Cluster 106(2)
        VMList = VM_K
    }
}
```

Further, listings 2, 3, and 4 below present datastore information that may be maintained in datastore tracking DB 306 for virtualized computing environments 202(1), 202(2), and 202(3) respectively shown in FIG. 2:

```
Listing 2-Datastore tracking information for environment 202(1)

Cluster 206(1) {
    Datastore D1 {
        Source = Storage array 212
        VMList = VM_A, VM_B
    }
    Datastore D2 {
        Source = Storage array 212
        VMList = VM_C, VM_D
    }
}
```

```
Listing 3-Datastore tracking information for environment 202(2)

Cluster 206(2) {
    Datastore D1 {
        Source = Storage array 212
        VMList = VM_E, VM_F
    }
    Datastore D2 {
        Source = Storage array 212
        VMList = VM_G, VM_H, VM_I
    }
}
```

```
Listing 4-Datastore tracking information for environment 202(3)

Cluster 206(3) {
    Datastore D2 {
        Source = Storage array 212
        VMList = VM_J, VM_K
    }
}
```

With the foregoing in place, when VIM server 300 receives a request to bring a datastore offline, datastore unavailability handler 308 can automatically identify, via datastore tracking database 306, all of the VMs in the virtualized computing environment that have virtual disks stored in the datastore. Datastore unavailability handler 308 can then, for each identified VM, automatically retrieve the storage-unavailability-response configuration setting for the VM and trigger execution of the storage-unavailability-response action defined in that configuration setting. Finally, once all of the identified VMs have been processed and their storage-unavailability-response actions have been executed, datastore unavailability handler 308 can send an unmount signal to the host systems/clusters that have mounted the datastore and return a confirmation/response message to the request originator (e.g., storage infrastructure control plane) indicating that the datastore can be safely taken offline.

It should be appreciated that FIGS. 1-3 and the high-level solution description above are illustrative and not intended to limit embodiments of the present disclosure. For example, although the foregoing description focuses on the automated tracking of VMs that have virtual disks in the mounted datastores of a virtualized computing environment and the automated execution of storage-unavailability-response actions for those VMs at the time of a datastore unavailability event/request, this solution can be extended to automatically track other types of storage objects (e.g., ISO images, templates, content libraries, etc.) that may be maintained in datastores and to automatically execute appropriate storage-unavailability-response actions for those other types of storage objects.

Further, although components 302-308 are shown as residing/running on VIM server 300 in FIG. 3, in alternative embodiments some or all of these components may be implemented on one or more other machines, either within or outside of the virtualized computing environment managed by VIM server 300.

Yet further, the various entities shown in FIGS. 1-3 may include sub-components and/or implement functions that are not specifically described. One of ordinary skill in the art will recognize other variations, modifications, and alternatives.

3. Datastore Unavailability Handler Workflow

Figure 4:
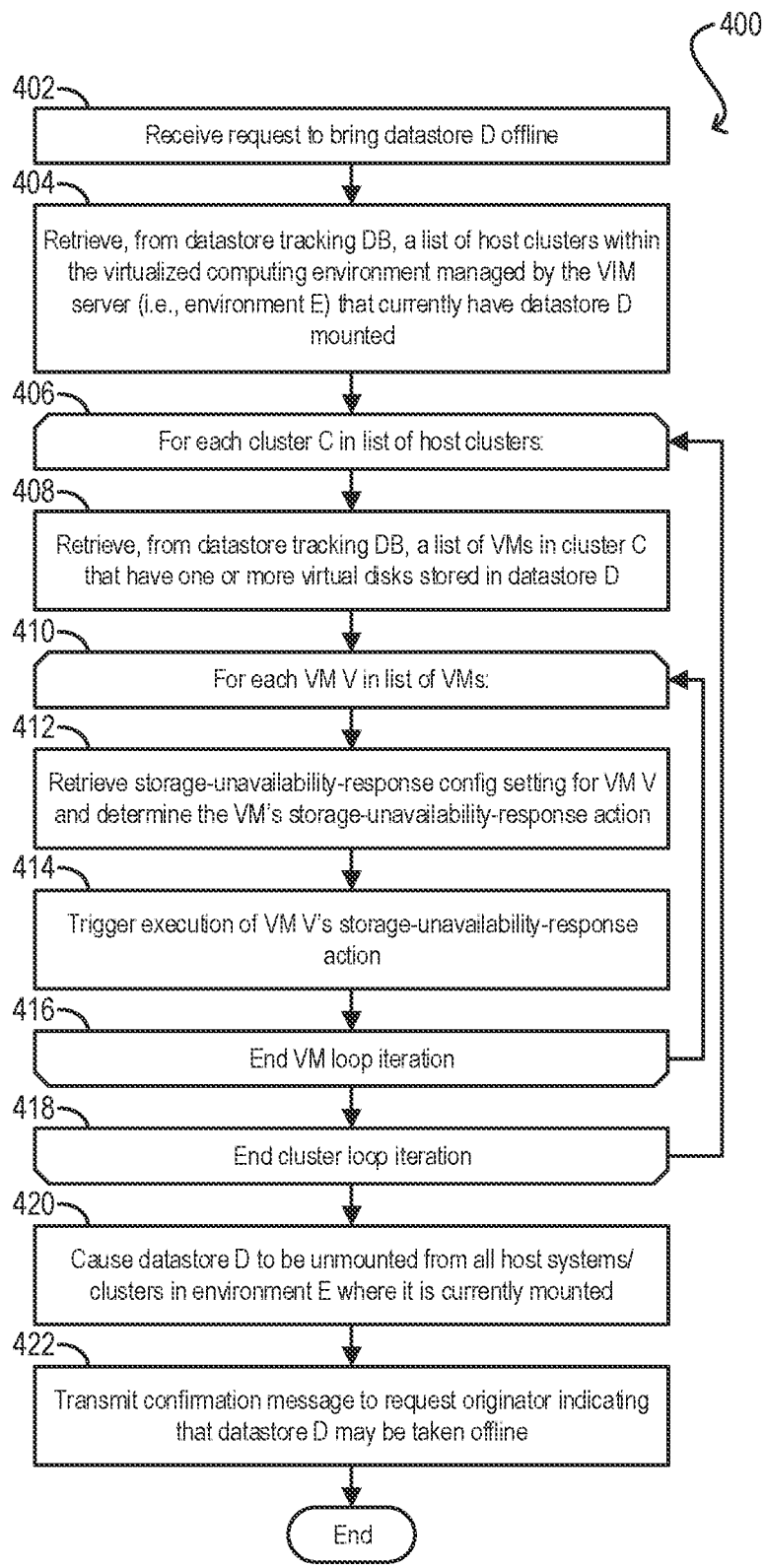
FIG. 4 depicts a datastore unavailability handler workflow according to certain embodiments.

FIG. 4 depicts a workflow 400 that provides additional details regarding the processing that may be performed by datastore unavailability handler 308 of FIG. 3 for handling the planned unavailability of a given datastore D according to certain embodiments. Workflow 400 assumes that each VM in the virtualized computing environment managed by VIM server 300 (i.e., environment E) has an appropriate storage-unavailability-response configuration setting 302 defined and datastore tracking DB 306 includes up-to-date information regarding the datastores mounted in environment E.

Starting with block 402, datastore unavailability handler 308 can receive a request to bring datastore D offline. In the case where datastore D resides on a virtual storage infrastructure of an HCI cluster within environment E, this request can be received from an administrator or software control plane of environment E. Alternatively, in the case where datastore D resides on an external storage infrastructure such as a storage array, this request can be received from an administrator or software control plane of the external storage infrastructure.

At block 404, datastore unavailability handler 308 can retrieve, from datastore tracking DB 306, a list of clusters within environment E that currently have datastore D mounted to one or more of the cluster's host systems. Datastore unavailability handler 306 can then enter a first loop for each cluster C in this list of clusters (block 406), retrieve, from datastore tracking DB 306, a list of VMs within cluster C that have one or more virtual disks stored in datastore D (block 408), and enter a second loop for each VM V in this list of VMs (block 410).

Within the second loop, datastore unavailability handler 308 can retrieve the storage-unavailability-response configuration setting for VM V and thereby determine the VM's storage-unavailability-response action (block 412). As mentioned previously, this action can involve, e.g., powering-off the VM, migrating the VM's virtual disk to another datastore that is available to the VM's host system/cluster, or doing nothing. Datastore unavailability handler 308 can thereafter trigger execution of the VM's storage-unavailability-response action (block 414), reach the end of the current VM loop iteration (block 416), and upon processing all VMs, reach the end of the current cluster loop iteration (block 418).

Once datastore unavailability handler 308 has iterated through all of the clusters identified at block 404, handler 308 can cause datastore D to be unmounted from the host systems in environment E where it is currently mounted (block 420). Finally, at block 422, datastore unavailability handler 308 can transmit a confirmation message to the originator of the request that datastore D may be taken offline. It should be noted that in scenarios where datastore D resides on an external storage infrastructure and is mounted to multiple different virtualized computing environments $E_1, \ldots, E_N$ (each with a different VIM server), the datastore unavailability request will be sent by the external storage infrastructure to the VIM server/datastore unavailability handler of each environment $E_i$. Accordingly, in these scenarios the external storage infrastructure can wait for a confirmation from the datastore unavailability handler of each environment $E_i$ before proceeding with taking datastore D out of service.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a general-purpose computer system selectively activated or configured by program code stored in the computer system. In particular, various general-purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid-state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while certain virtualization methods referenced herein have generally assumed that virtual machines present interfaces consistent with a particular hardware system, persons of ordinary skill in the art will recognize that the methods referenced can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations, and equivalents can be employed without departing from the scope hereof as defined by the claims.

What is claimed is:

1. A method for handling datastore unavailability, the method comprising:

at a time of provisioning a new virtual machine (VM) in a virtualized computing environment, creating, by a computer system acting as a virtual infrastructure management (VIM) server of the virtualized computing environment, a configuration setting for the new VM that defines an action to be taken on the new VM in a scenario where a datastore on which one or more virtual disks of the new VM reside is requested to be taken offline;

automatically tracking, by the computer system, datastores that are mounted to host clusters and host systems in the virtualized computing environment and maintaining information regarding the mounted datastores in a datastore tracking database;

receiving, by the computer system from an administrator, a request to bring a datastore offline while the datastore is operating normally, the request identifying the datastore;

retrieving, by the computer system from the datastore tracking database, a list of host clusters in the virtualized computing environment that currently have the datastore mounted;

for each host cluster in the list of host clusters, retrieving, by the computer system from the datastore tracking database, a list of VMs in the cluster that have one or more virtual disks stored in the datastore; and for each VM in the list of VMs:

retrieving, by the computer system, the configuration setting created for the VM at the time of provisioning of the VM; and triggering, by the computer system, execution of the action defined by the configuration setting.

2. The method of claim 1 wherein the virtualized computing environment includes a first hyper-converged infrastructure (HCI) cluster comprising a plurality of host systems with locally-attached physical storage devices, wherein the locally-attached physical storage devices are aggregated into a virtual storage pool that is made available to VMs running on the plurality of host systems for data storage, and wherein the datastore resides in the virtual storage pool of the first HCI cluster.

3. The method of claim 2 wherein the datastore is remotely mounted to one or more second HCI clusters in the virtualized computing environment, and wherein the one or more second HCI clusters are included in the list of host clusters.

4. The method of claim 1 wherein the datastore resides in a storage array external to the virtualized computing environment, and wherein the datastore is mounted to a host cluster in the virtualized computing environment and to one or more other host clusters in one or more other virtualized computing environments.

5. The method of claim 1
wherein the information maintained in the datastore tracking database includes:
the list of host clusters in the virtualized computing environment to which the datastore is currently mounted;
a source of the datastore; and
a list of VMs in each host cluster that has one or more virtual disks in the datastore.

6. The method of claim 1 wherein the action comprises powering-off the VM or migrating the one or more virtual disks to another datastore available to the VM.

7. The method of claim 1 further comprising, subsequently to triggering execution of the action for each VM in the list of VMs:
transmitting a message to an originator of the request indicating that the datastore may be taken offline.

8. The method of claim 1 further comprising, subsequently to triggering execution of the action for each VM in the list of VMs:
sending a datastore unmount signal for unmounting the datastore to each host cluster in the list of host clusters.

9. The method of claim 1 wherein the action defined in the configuration setting for the new VM is received from a user that initiates the provisioning of the new VM.

10. The method of claim 1 wherein the configuration setting for the new VM is populated with a default action associated with a host cluster in which the new VM is provisioned.

11. A non-transitory computer readable storage medium having stored thereon program code executable by a computer system acting as a virtual infrastructure management (VIM) server of a virtualized computing environment, the program code embodying a method for handling datastore unavailability, the method comprising:
at a time of provisioning a new virtual machine (VM) in the virtualized computing environment, creating a configuration setting for the new VM that defines an action to be taken on the new VM in a scenario where a datastore on which one or more virtual disks of the new VM reside is requested to be taken offline;
automatically tracking datastores that are mounted to host clusters and host systems in the virtualized computing environment and maintaining information regarding the mounted datastores in a datastore tracking database;
receiving, from an administrator, a request to bring a datastore offline while the datastore is operating normally, the request identifying the datastore;
retrieving, from the datastore tracking database, a list of host clusters in the virtualized computing environment that currently have the datastore mounted;
for each host cluster in the list of host clusters, retrieving, from the datastore tracking database, a list of VMs in the cluster that have one or more virtual disks stored in the datastore; and
for each VM in the list of VMs:
retrieving the configuration setting created for the VM at the time of provisioning of the VM; and
triggering execution of the action defined by the configuration setting.

12. The non-transitory computer readable storage medium of claim 11 wherein the virtualized computing environment includes a first hyper-converged infrastructure (HCI) cluster comprising a plurality of host systems with locally-attached physical storage devices, wherein the locally-attached physical storage devices are aggregated into a virtual storage pool that is made available to VMs running on the plurality of host systems for data storage, and wherein the datastore resides in the virtual storage pool of the first HCI cluster.

13. The non-transitory computer readable storage medium of claim 12 wherein the datastore is remotely mounted to one or more second HCI clusters in the virtualized computing environment, and wherein the one or more second HCI clusters are included in the list of host clusters.

14. The non-transitory computer readable storage medium of claim 11 wherein the datastore resides in a storage array external to the virtualized computing environment, and wherein the datastore is mounted to a host cluster in the virtualized computing environment and to one or more other host clusters in one or more other virtualized computing environments.

15. The non-transitory computer readable storage medium of claim 11 wherein
the information maintained in the datastore tracking database includes:
the list of host clusters in the virtualized computing environment to which the datastore is currently mounted;
a source of the datastore; and
a list of VMs in each host cluster that has one or more virtual disks in the datastore.

16. The non-transitory computer readable storage medium of claim 11 wherein the action comprises powering-off the VM or migrating the one or more virtual disks to another datastore available to the VM.

17. A computer system acting as a virtual infrastructure management (VIM) server of a virtualized computing environment, the computer system comprising:
a processor; and
a non-transitory computer readable medium having stored thereon program code that, when executed, causes the processor to:
at a time of provisioning a new virtual machine (VM) in the virtualized computing environment, create a configuration setting for the new VM that defines an action to be taken on the new VM in a scenario where a datastore on which one or more virtual disks of the new VM reside is requested to be taken offline;
automatically track datastores that are mounted to host clusters and host systems in the virtualized computing environment and maintaining information regarding the mounted datastores in a datastore tracking database;

receive, from an administrator, a request to bring a datastore offline while the datastore is operating normally, the request identifying the datastore;

retrieve, from the datastore tracking database, a list of host clusters in a virtualized computing environment that currently have the datastore mounted;

for each host cluster in the list of host clusters, retrieve, from the datastore tracking database, a list of VMs in the cluster that have one or more virtual disks stored in the datastore; and for each VM in the list of VMs:
retrieve the configuration setting created for the VM at the time of provisioning of the VM; and
trigger execution of the action identified defined by the configuration setting.

18. The computer system of claim 17 wherein the virtualized computing environment includes a first hyper-converged infrastructure (HCI) cluster comprising a plurality of host systems with locally-attached physical storage devices, wherein the locally-attached physical storage devices are aggregated into a virtual storage pool that is made available to VMs running on the plurality of host systems for data storage, and wherein the datastore resides in the virtual storage pool of the first HCI cluster.

19. The computer system of claim 18 wherein the datastore is remotely mounted to one or more second HCI clusters in the virtualized computing environment, and wherein the one or more second HCI clusters are included in the list of host clusters.

20. The computer system of claim 17 wherein the datastore resides in a storage array external to the virtualized computing environment, and wherein the datastore is mounted to a host cluster in the virtualized computing environment and to one or more other host clusters in one or more other virtualized computing environments.

21. The computer system of claim 17 wherein
the information maintained in the datastore tracking database includes:
the list of host clusters in the virtualized computing environment to which the datastore is currently mounted;
a source of the datastore; and
a list of VMs in each host cluster that has one or more virtual disks in the datastore.

22. The computer system of claim 17 wherein the action comprises powering-off the VM or migrating the one or more virtual disks to another datastore available to the VM.

* * * * *